B. Clayton.
Sleeve Button.
No. 4,016. Reissued June 7, 1870
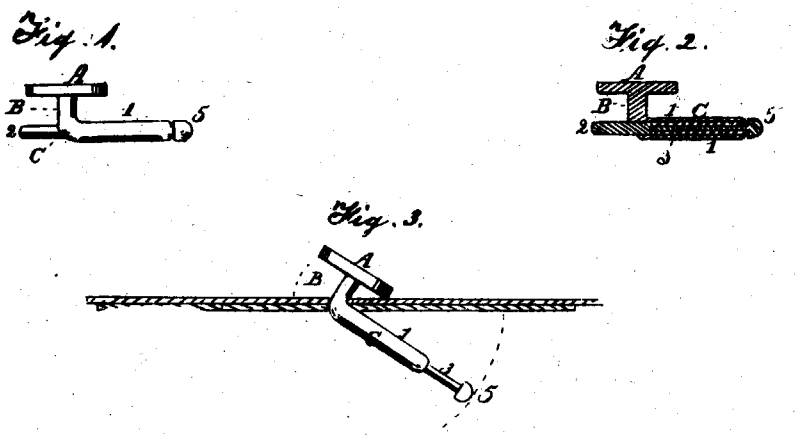
Witnesses:
Jas Simmons
Inventor
Barnes Clayton

UNITED STATES PATENT OFFICE.

BARNES CLAYTON, OF PHILADELPHIA, PENNSYLVANIA.

IMPROVEMENT IN SLEEVE-BUTTONS AND STUDS.

Specification forming part of Letters Patent No. 62,008, dated February 12, 1867; antedated February 2, 1867; Reissue No. 4,016, dated June 7, 1870.

*To all whom it may concern:*

Be it known that I, BARNES CLAYTON, of the city of Philadelphia, in the State of Pennsylvania, have invented certain Improvements in Fastenings for Studs and Sleeve-Buttons, of which the following is a specification.

My invention relates to the combination of a tubular case provided with a sliding projecting stem and a spiral spring with a head in such a manner that the projecting end can be readily drawn into the case by the thumb and finger, so that the said case can be easily passed through a small opening or through the button-hole of a garment sufficiently far to allow the withdrawn end of the stem to pass across behind the hole when the stem is released, the object of my invention being to afford a neat, ready, and reliable means of securing studs and similar articles of jewelry to garments.

In the accompanying drawings, Figure 1 is an enlarged side view of a shirt-bosom stud embodying my invention. Fig. 2 is a vertical longitudinal section of Fig. 1; Fig. 3, the same article of jewelry and fastening which are shown in Figs. 1 and 2 as being applied to a shirt-bosom.

The case C is a tube bent nearly at right angles, and its short shank or arm B soldered fast to the back of the stud, button, or kindred article of jewelry A, intended to be secured to the garment. A round opening is made at the bend to correspond in its diameter with the bore of the longer end 1 of the tube or case C and in line with the same. The open end of the said part 1 is flanged so as to form an abutment for one end of the inclosed spiral spring 4 within the case, and at the same time allow the more slender part, 3, of the stem to slide accurately through the spring and the opening, while the projecting end 2, having a diameter corresponding with the bore of the part 1 of the case, slides accurately in the opposite end of the latter. At the junction of the larger and the smaller portions of the said stem a shoulder is made, against which the other end of the spiral spring 4 abuts.

On the outer end of the slender part 3 of the stem is a head or ball, 5, which serves to prevent the spring from forcing the stem entirely out of the case, and also as a handle for operating it.

In applying the article of jewelry fitted with this fastening the larger end 1 of the case is inserted endwise into any opening, and by means of the operator's finger and thumb applied to the knob 5, the spring is compressed and the projecting end 2 of the stem drawn inside of tube C thereby, as represented in Fig. 3, when the short shank B can be readily drawn through the hole in the garment far enough to let the part 2 of the stem pass behind the said hole in the garment, when, by releasing the head 5, the spring 4 in reacting forces out the end of the stem, as represented in Figs. 1 and 2, and thus secures the article to the garment. A removal of the article is effected in the same manner by reversing the movement of the case in the hole.

I do not desire to claim, broadly, a spring-catch for fastening studs, buttons, and kindred articles of jewelry to apparel; but What I desire to secure by Letters Patent is—

The fastening, consisting of the case C, stem 2, 3, and 5, and spring 4, in combination with a head, A, substantially as and for the purpose hereinbefore set forth.

BARNES CLAYTON.

Witnesses:
BENJ. MORISON,
WM. H. MORISON.